US009286779B2

(12) United States Patent
Shaw et al.

(10) Patent No.: US 9,286,779 B2
(45) Date of Patent: Mar. 15, 2016

(54) DETECTOR DEVICES

(75) Inventors: John E. A. Shaw, West Drayton (GB); Timothy Andrew James, Harrow (GB)

(73) Assignee: TYCO FIRE & SECURITY GMBH, Neuhausen Am Rheinfall (CH)

( * ) Notice: Subject to any disclaimer, the term of this patent is extended or adjusted under 35 U.S.C. 154(b) by 395 days.

(21) Appl. No.: 13/578,522

(22) PCT Filed: Feb. 11, 2011

(86) PCT No.: PCT/GB2011/000189

§ 371 (c)(1), (2), (4) Date: Sep. 12, 2012

(87) PCT Pub. No.: WO2011/098773

PCT Pub. Date: Aug. 18, 2011

(65) Prior Publication Data

US 2013/0031957 A1 Feb. 7, 2013

(30) Foreign Application Priority Data

Feb. 11, 2010 (GB) .................................. 1002336.4

(51) Int. Cl.

*G01N 7/00* (2006.01)
*G08B 17/00* (2006.01)
*G08B 29/24* (2006.01)

(52) U.S. Cl.

CPC ................ *G08B 17/00* (2013.01); *G08B 29/24* (2013.01)

(58) Field of Classification Search

CPC ..... G06F 19/00; G06F 3/0488; H04L 65/403; A61B 17/320068; A61B 5/0205; C08L 79/02; C12Q 1/6825; G01D 11/30; G01N 27/4077; C07C 29/1518; C07C 31/04; C04B 18/027; B01D 35/0273; B29C 65/00; G08B 29/145; G08B 17/12; G08B 29/043; G08B 17/107

USPC ................ 73/28.01, 23.2, 865.8, 28.4, 31.01, 73/31.02, 31.03, 61.71, 61.72

See application file for complete search history.

(56) References Cited

U.S. PATENT DOCUMENTS 838,794 A * 12/1906 Matteson ............. A62C 13/003 169/82
1,006,500 A * 10/1911 Peterson ............... F16D 41/206 123/185.8
2,633,532 A * 3/1953 Sichak ................... H01Q 13/12 333/242

(Continued)

FOREIGN PATENT DOCUMENTS

AU 2007331243 A1 6/2008
DE 10255769 A1 6/2004

(Continued)

OTHER PUBLICATIONS

Ionic Zone Nano TiO2 PCO Liquid; http://www.air-purifiers-superstore.com/TiO2_catalyst_self_cleaning_liquid.html; Jun. 14, 2012.

(Continued)

*Primary Examiner* — Peter Macchiarolo
*Assistant Examiner* — Mohammed Keramet-Amircola
(74) *Attorney, Agent, or Firm* — Kacvinsky Daisak Bluni PLLC

(57) ABSTRACT

A detector includes a component having a surface. The surface includes, or is at least partially coated with, a contaminant-resistant or self-cleaning material. This allows the detector to remain clean without manual cleaning.

24 Claims, 10 Drawing Sheets

(56) References Cited

U.S. PATENT DOCUMENTS

| | | | | |
|---|---|---|---|---|
| 4,387,973 | A | 6/1983 | Martin | |
| 4,404,841 | A | 9/1983 | Franke et al. | |
| 5,969,623 | A | 10/1999 | Fleury et al. | |
| 6,170,318 | B1 * | 1/2001 | Lewis | G01N 27/126 340/632 |
| 6,840,061 | B1 | 1/2005 | Hurst et al. | |
| 8,421,046 | B2 | 4/2013 | Leuthold | |
| 2001/0035662 | A1 | 11/2001 | Pike et al. | |
| 2001/0051273 | A1 | 12/2001 | Veerasamy | |
| 2005/0057362 | A1 | 3/2005 | Arndt et al. | |
| 2006/0147705 | A1 | 7/2006 | Huang et al. | |

FOREIGN PATENT DOCUMENTS

| | | | | | |
|---|---|---|---|---|---|
| DE | 202005014771 | U1 | * | 9/2005 | G08B 17/00 |
| DE | 202005014771 | | * | 12/2005 | |
| EP | 0838794 | | * | 4/1998 | G08B 17/10 |
| EP | 0838794 | B1 | * | 4/1998 | G08B 17/107 |
| EP | 1006500 | A2 | * | 6/2000 | G08B 17/10 |
| EP | 1055924 | A2 | | 11/2000 | |
| EP | 1308425 | A2 | | 5/2003 | |
| EP | 0838794 | B1 | * | 12/2003 | G08B 17/107 |
| EP | 1816462 | A1 | | 8/2007 | |
| GB | 137697 | A | | 1/1920 | |
| JP | 2114132 | U | | 9/1990 | |
| JP | 2008220709 | A | | 9/2008 | |
| WO | 98/58117 | A1 | | 12/1998 | |
| WO | 2009021697 | A1 | | 2/2009 | |

OTHER PUBLICATIONS

Scientists ponder self-cleaning bathroom; http://www.abc.net.au/news/newsitems/200601/s1553066.htm; Jan. 23, 2006.

Dust Repellent Treatment for PV and Solar Thermal Installations; http://www.chamelic.co.uk/index.htm; Mar. 29, 2010.

Plenti's Nano 4 Self Cleaning Glass; http://www.plenti.hr/en/glass-and-ceramics/plentis-nano-4-self-cleaning-glass.html; Dec. 22, 2008.

Search Report from corresponding GB1002336.4 dated May 21, 2010.

Parkin et al., "Self-cleaning coatings"; J Materials Chem; 2005, 15, 1689-1695 (Dec. 22, 2004).

Self-cleaning; http://www.pilkington.com/international+products/activ/default.htm.

Huawei Launches New Flagship P8 with P2i Nano-Coating; http://www.p2ilabs.com/.

* cited by examiner 3101
301
304
305
307
306
I
t
302
303
308

301
304
309
305
307
306
309
I
t
302
303
308

504
5011
5103
506
503
502
505
501
5103
504
503

805
801

803
802
804
805
801

803
802
806
804
805
801

803
802
807
804

902
903
A
B
901

902
901
903
A
B

904

905

DETECTOR DEVICES

This invention relates to detector devices, and especially such devices used to detect fires or fire related conditions.

Fire detectors may contain a variety of sensors individually or in combination. Some fire detectors operate by monitoring for airborne fire products such as smoke, gaseous products such as CO, and heat, while flame detectors, operate by monitoring for radiation, infrared, visible, or UV, which may be transmitted from fire sites.

The majority of detectors for airborne fire products comprise one or more of smoke sensors (e.g. light scattering and ionization types), heat sensors (e.g. thermistors), and gas sensors (e.g. electrochemical CO sensors). Optical obscuration type detectors may also be deployed for fire product detection. Optical flame detectors employ systems sensitive to relevant radiation which may be in selected wavebands. Most significant of these wavebands are near 4.3 μm, from $CO_2$ in flames from carbon containing fuels, and 2.7-3.2 μM, corresponding to water molecules in flames from hydrogen containing fuels, as well as adjacent wavebands to check on background variations.

Fire detectors are exposed to the environments where they are deployed and subject to contamination by solids, dusts, aerosol liquids or condensates from the gaseous phase. Contaminant accumulation on or in a detector can affect its function. These effects on function may arise from changes in optical properties, or electrical properties, or mass or heat transfer at or within detector components or assemblies, or from combinations of these changes. This can be especially important where detectors are deployed in environments where contaminant vapour, particles, or aerosols are present, such as in industrial premises and plant, and regions with significant vehicular traffic or locations where environmental or weather conditions promote formation or deposition of water droplets onto surfaces.

The effects of contamination on the surface of an optical component can include changes in reflectivity, scattering, transmission, absorption and refraction. Additionally contaminants can affect the wetting properties of surfaces including those of windows or lenses which can result in beading of fluids on the surface further affecting transmission, reflection and absorption due to layer thickness but also through adherent droplets acting as lenses causing distortion interfering with radiation passage to sensors. This can be particularly problematic in imaging systems where image quality can be compromised.

For radiation falling on clean surfaces, reflectivity, scattering, transmission, absorption and refraction may be controlled by material and structure design to be suitable for the device function. For contaminated surface this control may be lost interfering with device function. Contamination can result in changes in radiation intensity, direction and spectral distribution resulting changes in sensor device signal levels and image distortion.

Detector performance may depend on heat transport and fire product mass transport to and within detector structures. Contamination build up on walls of air or smoke entry structures, including vane structure to allow fire product entry while preventing ingress by light or large objects, meshes for exclusion of small flies or arthropods, and inlet openings of gas sensors, may by partial or complete occlusion of opening or coating of components affect such transport processes, generally reducing fluxes of gases or aerosols to points or volumes within the detector at which they can be sensed. Such contamination build up may result in a differential filtering effects or formation of aggregates which if passing into a sensing region may have effects different to those of unfiltered or un-aggregated material. Build up of contaminants on temperature sensor components can result in changes in thermal mass of such components and rates of heat flux to the sensor element.

Many detectors rely on electrical circuit components for one or more of sensor output generation or transduction, signal processing, and signal transmission. Contamination build up may affect electrical components or circuits by modification of surface resistance or capacitance, affecting particularly operation of high impedance circuits, or by promotion of corrosive damage, especially where the contamination is or contains water.

An important requirement for fire detectors is long term stability. Accumulation of contaminants on surfaces of detector components can lead to undesirable changes in characteristics. Detectors may be deployed in environments which are not closely controlled and can, from time to time, contain materials such as dust, fumes, and vapours which in the absence of a fire generally do not reach levels sufficient to generate alarms. Such contaminants can deposit on or modify exposed component surfaces resulting in changes in detector output and performance.

Detector devices have surfaces, hereafter referred to as detector surfaces, the condition or contamination of which can affect detector performance. Such detector surfaces relevant to detector performance include optical components, structures which may affect mass or thermal transport, and electrical circuit components. Accumulation of contaminants including dusts, condensates, precipitation on or in a detector can affect its function. Contamination effects on detector function depend on detector type, detector components, and on contamination type and loading. It is clearly desirable that excessive contamination of such detector surfaces be prevented or removed.

Present methods of removing soiling, contamination build up in or on fire detector devices involve manually cleaning of detectors or components. Brushing, wiping, and/or blowing through/over the components with high speed gas jets can have limited effectiveness where surfaces allow strong adhesion to contaminants. Present cleaning procedures involve temporary detector shut down or disablement and in some instances removal from the operating system. Periodically removing or disabling detectors for cleaning is costly and can disable the protection for significant periods.

Standard methods to reduce problems with contamination of, or water adhesion, to optical components have predominantly relied on wiping the surfaces manually, or by using mechanical wipers which may be automated. Particularly where misting of optical components by liquid droplets occurs, for example by condensation, heating can be used to remove deposits by evaporation or to prevent condensation, but this route has limitations where droplets may contain dissolved non volatile components or where the requirements energy provision are excessive. Generally the existing solutions can be expensive, labour intensive, and can have significant maintenance requirements. Wiping components and optical surfaces can also cause wear and limit lifetime of components. Issues can include mechanical abrasion or scratching, especially where particulate contamination occurs.

A known solution involves the use of a sacrificial layer which can dissolve away or can be mechanically stripped. These solutions have limited lifetimes and are not readily applicable for wavelength ranges where window material choices are limited, such as for IR transmission optics. As the existing clean up operations are time consuming and expensive, and may only be partially successful, replacement of a soiled detector with a new one is often selected as the most cost effective action. There is clearly a need to develop means to maintain clean conditions on the working parts of fire detectors or reduce the rate of soiling or contamination build up or ease removal of contaminants by reducing adhesion to detector surfaces.

An aim of the present invention is to provide a detector having means for preventing, or at least limiting, detector surface contamination, which overcomes, or at least mitigates the problems associated with the prior art.

In a first aspect of the present invention, a detector for a fire related condition includes a component having a surface; wherein the surface includes, or is at least partially coated with a material having contaminant-resistant properties; and wherein the material comprises a low energy material having a contact angle to water of greater than about 65 degrees in air.

In a second aspect of the present invention a detector for a fire related condition includes a component having a surface; wherein the surface includes, or is at least partially coated with a material having self-cleaning properties at ambient temperatures; and wherein the material is arranged to exhibit hydrophilic properties. Preferably, the material comprises one or more metal oxide materials.

This specification refers throughout to “a contaminant-resistant or self-cleaning material”. By this term, we mean any coating or treated surface including material which causes the surface to which it is applied to either resist the adhesion of contaminants or impart a cleaning effect on the surface to remove contaminants.

The term “contact angle” used herein is intended to mean the equilibrium contact angle.

The term “metal oxide” used herein is intended to include metal oxide derivative compositions. These metal oxide derivatives may include stoichiometric and non-stoichiometric compositions, compositions containing more than one type of metallic element, and compositions including a proportion of one or more non-metals, other than oxygen. The metallic and non-metallic species will usually be in ionic form but may include some species involved in non-ionic bonding or unionised form. Non metals other than oxygen in metal oxide derivatives may include hydrogen, nitrogen, phosphorus, sulphur or other chalcogens, and fluorine or other halogens. Oxygen may be included as ions other than oxide ion which may include hydroxide, peroxide ions, and hydroperoxide ions.

It is known to change the optical absorption and other properties of metal oxides, including titania, by incorporating non-metallic species such as nitrogen in the structure, either by substitution for oxygen or as interstitial additions to the oxide structure.

Known methods for providing contaminant resistant or self-cleaning or clearing material surfaces most generally involve forming or coating surfaces with one or other of two material types, the first of which may be classed as hydrophobic, and the second of which may be classed as chemically active and hydrophyllic. The chemically active hydrophyllic surfaces may in some cases be photochemically activated.

The contaminant resistant or self-cleaning surfaces can be prepared by coating substrate materials with materials having such properties, or can be formed of from material compositions consisting of, or containing, materials having such properties. Incorporation of chemically active or photochemically active materials as fillers in polymeric materials used for device construction will, given sufficient loading, result in the presence of such materials at moulding surfaces. Where optically absorbing surfaces are required, coatings or fillers used can include black manganese or copper oxides and black titania related compositions such as mixed titanium iron oxides (ilemite). When white, pale, reflective, or scattering surfaces are required, for example for detector outer housings, transparent or white scattering coatings or fillers can be used including titania based compositions.

For materials which are oxidatively active without need for photoexcitation, such as compositions involving oxides of manganese and copper, very low light levels inside a fire detector do not constitute an impediment to function. The relatively slow oxidative processes of these materials under normal ambient conditions are compatible only with low contamination rates and are not amenable to acceleration in response to an increase in contamination. These materials being black or dark coloured can be effective in forming and maintaining optically absorbing surfaces, but are not suitable for windows, lenses or mirror surfaces.

Each of the fire detector systems described has at least one component surface for which contamination of that surface by material from the environment results in change in detector performance characteristics, such as stability or sensitivity. Any detector surface on which contaminants or their precursors may deposit and where degree of contamination is relevant to detector performance is henceforth referred to as a detector surface. An aim of the present invention is to provide a detector having means for preventing, or at least limiting, detector surface contamination, which overcomes, or at least mitigates the problems associated with the prior art.

Examples of application of contamination resistant or self cleaning materials are given in embodiments according to the present invention below.

In some embodiments, the detector performance relevant surface is an optical surface. By “optical surface”, we mean any surface that transmits, reflects, refracts, or has some other optical effect on, radiation incident thereon. The radiation may be within, or outside, the visible spectrum.

Advantageously in each embodiment, the contaminant-resistant or self-cleaning material is such that the properties relevant to detector function of the detector surface in which the material is present, or to which the material is applied, are not changed so as to substantially degrade detector function as compared with function of the detector according to prior art when that detector surface is in an uncontaminated condition. Contamination resistant or self cleaning surfaces should be selected for any application so as to meet this requirement. This selection is generally not difficult given the choice of materials available and because the very thin layers which may be deployed which may have little effect on relevant properties. However it is clear that dark absorbing metal oxides such as oxides of manganese, copper, and iron which may usefully be applied on surfaces intended to show low reflectivity should not be applied onto reflecting or transmissive components such as mirrors, windows, or lenses.

Preferably in some embodiments, the contaminant-resistant or self-cleaning material is a material selected from the following group: hydrophobic material, oleophobic material, hydrocarbon group material or fluorocarbon group material, hydrocarbon polymer material, fluorocarbon polymer material, copolymer material, fluorocarbon molecular attached film material, diamond-containing material and diamond-like carbon-containing material.

Preferably in some embodiments, the contaminant-resistant or self-cleaning material comprising a hydrophobic and/or oleophobic material which has a water contact angle of at least 65 degrees and, more preferably, a water contact angle of greater than 90 degrees and, most preferably, a water contact angle of greater than 90 degrees.

Preferably in some embodiments, the contaminant-resistant or self-cleaning material is a material which promotes oxidative degradation of organic contaminants, which self cleaning material may be selected from metal oxides and metal oxide derivative, and which oxides and derivatives may include but are not limited to oxides and oxide derivatives of manganese, copper, iron, titanium and combinations thereof Preferably in some embodiments, the contaminant-resistant or self-cleaning material is a material which may be photoactivated to promotes oxidative degradation of organic contaminants, which self cleaning material may be selected from metal oxides and metal oxide derivative, and which oxides and derivatives may include but are not limited to oxides and oxide derivatives of titanium, tungsten, tin, zinc and combinations thereof.

Preferably in some embodiments, the contaminant-resistant or self-cleaning material is hydrophilic or a material which becomes hydrophilic when photoactivated.

Advantageously in some embodiments, the contaminant-resistant or self-cleaning material further includes a catalyst component, which may comprise one or more of the following: a noble group metal, silver or a silver compound, a platinum group metal.

Where the function of the contaminant-resistant or self-cleaning material is promoted or modified by photoactivation, said photoactivation may be by ambient illumination levels, including illumination by sunlight, or alternatively or additionally the detector may comprise one or more additional radiation sources for detector surface photoactivation. Preferably photoactivation is by radiation in the visible or ultra violet spectral regions.

Preferably in some embodiments, the contaminant-resistant or self-cleaning material is hydrophilic, or becomes hydrophilic following exposure to suitable radiation.

Preferably in some embodiments, the contaminant-resistant or self-cleaning material comprising a material which is hydrophyllic or becomes hydrophyllic following radiation exposure in which condition the material has a water contact angle of not greater than 25 degrees and, more preferably, a water contact angle of not greater than 10 degrees.

Surfaces of fire detectors, which may be subject to environmental contamination and are relevant to detector performance, are each referred to here as detector surfaces where a fire detector may have one or more detector surfaces. The detector surfaces comprise surfaces of detector components from the following group: an optical absorber, a reflector, a transmitter, a light trap, a window, a lens, a mirror, a light pipe, a light guide, a filter, a light source, a gas sensor element, an aerosol sensor element, an air passage conduit, an ambient light screen, an insect screen, an electrically active component, a temperature measuring device, a potential measuring device, a current measuring device, and a circuit board bearing electrically active components.

Embodiments of the present invention include provision in a fire detector of contamination resistance or self cleaning capability to one or more detector surfaces forming at least part of one or more detector components identified above. Said provision is preferably by use of one or more detector surfaces wherein at least part of said one or more surfaces is at least partially formed or coated with, a contaminant-resistant or self-cleaning material referred to above. Such contamination resistant or self cleaning surfaces may incorporated during component or detector manufacture or may in some cases be applied after manufacture or installation. Contamination resistant or self cleaning materials applied after manufacture may be renewed or reapplied periodically or in response to monitoring of equipment showing loss of effect.

Advantageously in some embodiments, the detector may further comprise one or more of fluid flow generation means including liquid or gas or air flow generation means, arranged to direct a flow of fluid onto or over one or more surfaces of the detector, vibration generation means, arranged to cause a surface, or air adjacent to a surface, to vibrate to move liquid or particulates from a detector surface.

Advantageously in some embodiments, the detector further comprises a feedback circuit, which is arranged to monitor the detector, and operate said flow generation or vibration means if a level of contamination exceeds a predetermined level.

The detector may be a smoke, gas, heat, or flame detector.

In a second aspect of the present invention, a detection system comprises a plurality of detectors, wherein one or more of the detectors is a detector incorporating one or more functional components incorporating a contamination resistant or self cleaning surface as described herein.

The invention will now be described, by way of example, with reference to the drawings, 1 to 9 in which:

FIG. 1 represents diagrammatically operation of a hydrophobic contamination resistant material applied to a detector surface, in particular a window which may form part of a fire detector, along with diagrammatic representation of contamination displacement enhancement means and monitoring and feedback system which may be coupled to such displacement enhancement means.

FIG. 2 represents diagrammatically operation of a hydrophyllic contamination resistant or self cleaning material applied to detector surface, in particular a window which may form part of a fire detector, along with diagrammatic representation of contamination displacement enhancement means and monitoring and feedback system which may be coupled to such displacement enhancement means and to photoactivation source.

Contaminant resistant or self-cleaning or clearing material surfaces include use of either low energy or hydrophobic surfaces to which contaminants are poorly adherent and from which they are relatively easily displaced, or hydrophyllic chemically active surfaces at which contaminants are degraded and/or easily displaced by water. The hydrophyllic surfaces may in some cases be photochemically activated.

A surface to be kept clean or clear may be provided with a low energy or strongly hydrophobic surface, whose contact angle to water is high and preferably approaches or preferably exceeds 90 degrees. For such surfaces the adhesion or contaminant materials, water and water borne contaminants is weak.

The reduced adhesive forces between contaminants and detector surfaces reduces contaminant deposition rates and allows air movements, vibration, or inertial forces, either naturally occurring or supplemented by artificially induced means, to displace poorly adherent material or droplets. Such forces can be applied to cause mobile droplets of liquids and non adherent particles to rapidly run off of or otherwise migrate from selected areas of windows or optical components. Further the use of hydrophobic surfaces is know to affect condensation and frost deposition, generally retarding condensation and deposition. Where component heating is employed to reduce or prevent condensation, power requirements are reduced for hydrophobic surfaces.

Such a low-energy surface can be achieved by forming or coating the surface with a simple hydrocarbon or, more effectively, with either a fluorocarbon material or molecules, or material having hydrogenated diamond or diamond-like carbon surfaces. The hydrocarbon or fluorocarbon materials can be bonded to, or caused to adhere to, surfaces directly or via intermediate groups or structures such as silane or siloxane groups. The chemical stability and low polarisability of the hydrogen or fluorine atoms in such hydro or fluorocarbon surfaces tend to produce chemically inert surfaces and to minimize adhesive forces. Hydrophobic surfaces are here taken to include surfaces which may be classed as superhydrophobic. Superhydrophobic surfaces generally consist of hydrophobic entities formed as microscopic or submicroscopic arrays or mats of hydrophobic or hydrophobic tipped fibres, posts, or rod like molecular species deposited onto a surface.

Figure 1:
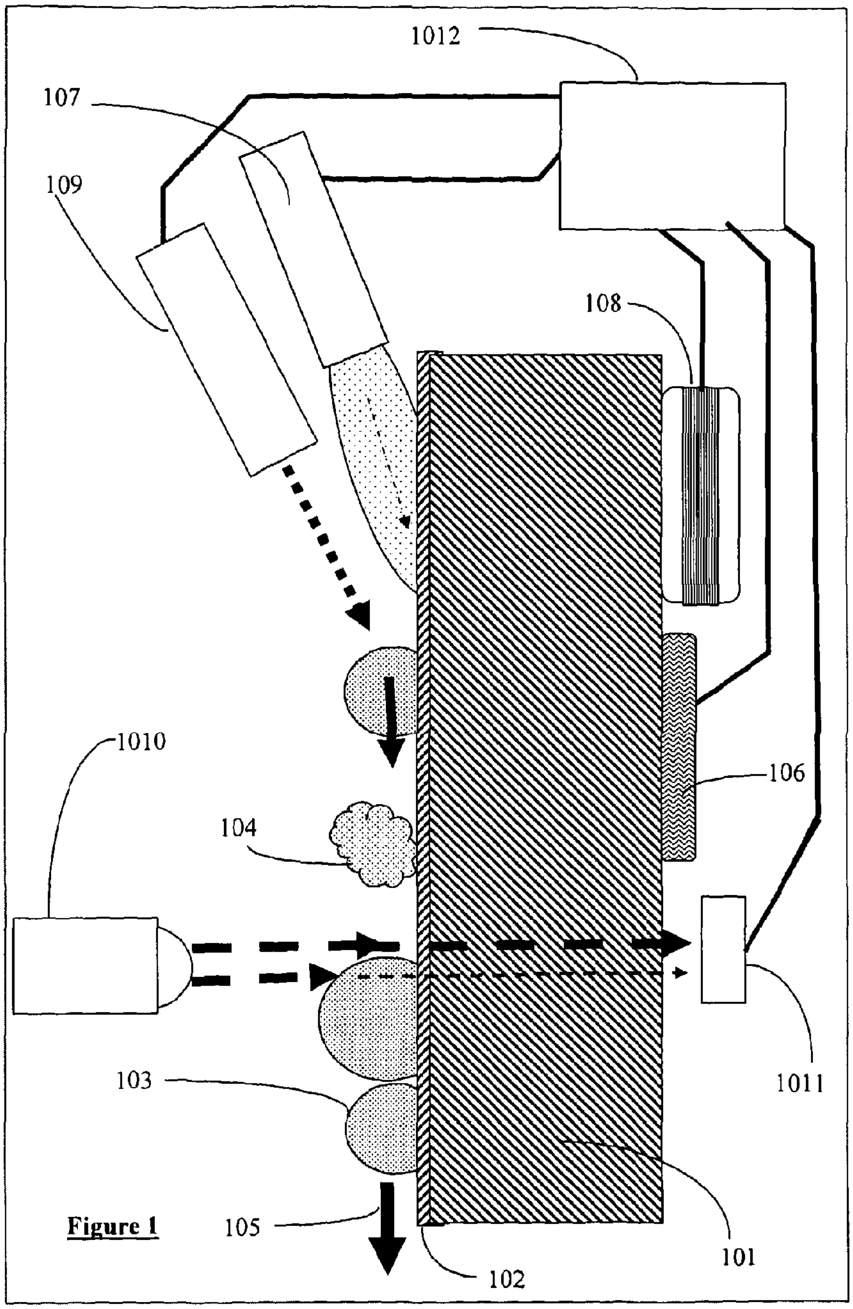

Self clearing processes associated with a low energy or strongly hydrophobic surface and with enhancements to disturb deposits which may be applied to components of fire detection devices are represented diagrammatically in FIG. 1. In FIG. 1, a flame detector is shown which has a window through which radiation from a fire passes to an optical detector. A substrate 101, in this case a transparent window, has a low energy or strongly hydrophobic surface 102. Liquid contamination 103 forms mobile beads with high contact angle to the surface 102. Particulate material 104 in contact with surface 102 does not adhere strongly to the surface. The contaminants 103 and 104 may be moved 105 either passively by gravitational forces or ambient air movements which may be enhanced by selected orientation of the substrate 101. The deposition of contaminant material by condensation or its removal by evaporation may be enhanced by heating of the substrate or surface by a heater mechanism 106. Such heater shown attached to the substrate may also be mounted separate to the substrate transferring heat to the contaminant by convective or radiative means. The power required for heater 106 to maintain non condensing conditions will be lower than in the absence of a low energy or strongly hydrophobic surface. Displacement of the contaminants 103 and 104 may also be enhance by artificially induced disturbance such as by liquid flow from a controlled source 107, by vibrations induced in the component or surrounding air by a vibration drive unit 108, for example a piezoelectric vibrator, or by air flow induced by a blower or pressurised jet device 109. Such deposit removal enhancement devices 106 to 109 which will generally require less power than equivalents applied to maintain clarity of a surface in the absence of a low energy or strongly hydrophobic surface 102 may be deployed individually or in combination. Operation of such deposit removal enhancement devices may be coupled to an arrangement for monitoring a level of contamination. Such a contamination monitor may consist of a radiation source 1010 and photosensor 1011 positioned such that contamination presence changes radiation level falling on the photo-sensor. Output from the photo-sensor may be couple via a signal monitoring and control system 1012 which may control operation of any of installed deposit removal enhancement devices 106 to 109.

In a second method, the surface to be kept clean or clear is provided with a chemically or photochemically or catalytically active layer, generally comprising or including metal oxides, to act upon contaminants contacting said surface to reactively degrade such contaminants and their adhesion to the surfaces. This most generally involves oxidative processes and may proceed to conversion of organic contaminants to small volatile products and molecules which may include carbon dioxide ($CO_2$), carbon monoxide (CO), and water vapour ($H_2O$), which leave the surface as gases. Such chemically active self-cleaning surfaces can induce partial or complete consumption of contaminants by oxidative degradation, and weakening of bonding between surface and contaminants, especially in presence of water or water vapour. Such chemically active self-cleaning surfaces can include photoactivated materials where such surfaces, most usually based on a very thin deposit of titanium dioxide (titania), promote photochemical degradation of contaminants and generation of a highly hydrophilic surface where contact angle to water is low and preferably approaches 0 degrees. Low contact angle wetting by water or other liquid contaminants allows spreading of such liquids as thin films aiding fluid run off and resulting in thinner layers with low surface curvature which will generally provide lower optical attenuation or refractive effects to distort light paths and imaging. Thin liquid layers having higher surface to volume ratios may also be more rapidly removed by evaporation, either natural or induced by component heating.

Such chemically active hydrophyllic surfaces can enhance the removal of contaminant by water flow aiding penetration of molecular or bulk water between contaminant and surface aiding contaminant lift off.

Thin coatings of photochemically active materials, and especially compositions based on titania with or without doping or performance enhancing additives are known for this purpose and can, in the presence of light, especially light having UV and blue end optical wavelengths oxidatively degrade organic materials. The most effective and optimal wavelength band can be influenced by oxide type and doping. Preferably, the radiation has a wavelength of between around 200 nm and 600 nm. More preferably, the radiation has a wavelength of between around 300 nm and 600 nm. The use of a very thin layer of titania deposits to provide self-cleaning windows is well known, for example Pilkington's® self-cleaning glass. Titania based compositions have also been applied in photochemically activated self-cleaning/pollutant degrading structures including tiles. The material can be in nanoparticulate form, or in the form of a thin coating, and can incorporate other components to act as catalysts or to modify the optical band absorbed.

Figure 2:
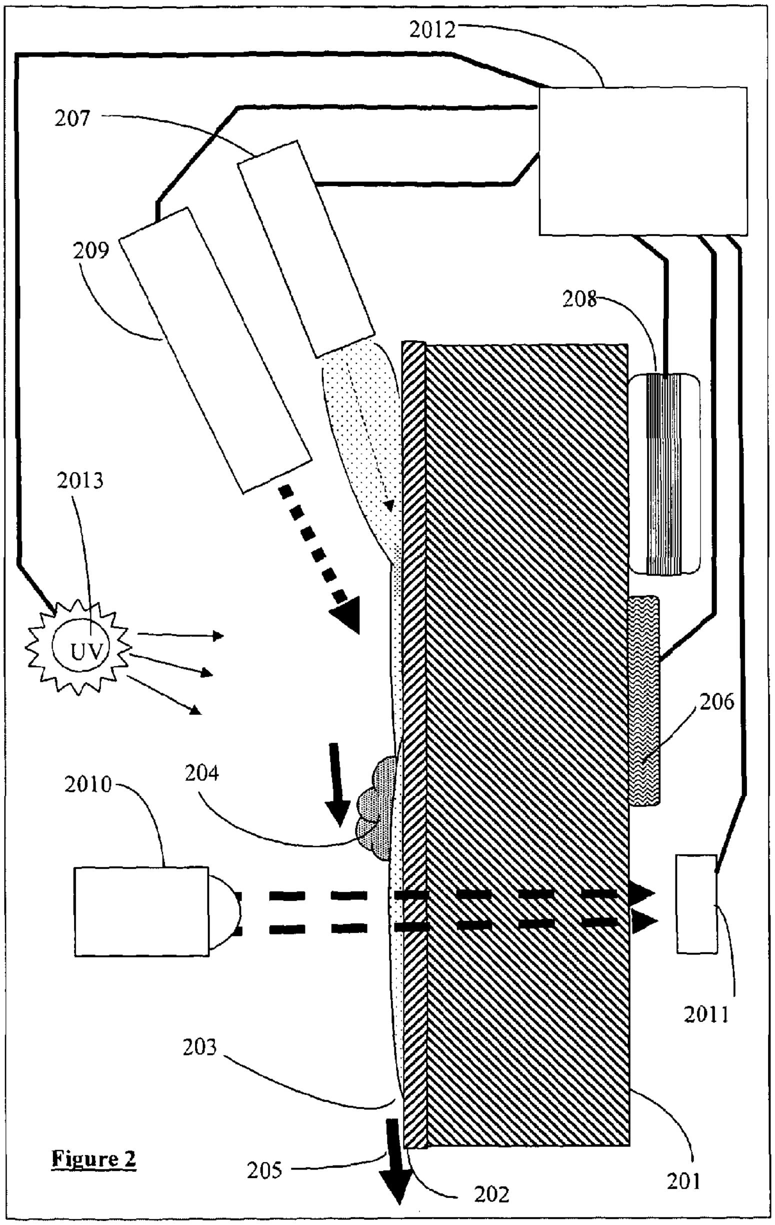

Self clearing processes associated with a chemically or photochemically or catalytically active hydrophyllic surface and with enhancements to disturb deposits which may be applied to components of fire detection devices are represented diagrammatically in FIG. 2. FIG. 2 shows a flame detector having a substrate 201, in this case a transparent window, which has a chemically or photochemically or catalytically active hydrophyllic surface 202. Liquid contamination 203 spreads to form a thin low contact angle film on the surface. Forming a thin film moving excess fluid out of the optical path reduces obscuration or refraction effects. A liquid, and especially an aqueous liquid film, will wet beneath particulate or organic material contaminants aiding their displacement and removal. Photochemically active surfaces such as those based on $TiO_2$ are rendered hydrophyllic by exposure to light from source 2013, particularly light within the near UV waveband, which light also activates chemical oxidation processes at oxidisable material contacting layer 202. The light source 2013 may be natural, the sun, or artificial and controlled. Aqueous contaminant may drain 205 under gravitation or be induced to flow by air movements or vibration. Displacement of the contaminants may also be enhanced by deposit removal enhancement devices 206, 207, 208, 209 as described for FIG. 1. Such deposit removal enhancement devices 206 to 209 which will generally require less power than equivalents applied to maintain clarity of a surface in the absence of a self cleaning strongly hydrophyllic surface 202 may be deployed individually or in combination. Operation of such deposit removal enhancement devices may be coupled to an arrangement for monitoring a level of contamination. Such a contamination monitor may consist of a radiation source 2010 and photo-sensor 2011 and control system 2012 operated as described with previously with reference to FIG. 1 but additionally where appropriate controlling a surface activating light source 2013.

For relatively slow deposition of contaminants, removal by water flow is not necessary. The degradation of contaminants can be enhanced by the use of catalysts comprising transition metals, and their compounds, especially oxides and noble metals, and especially from the group including Platinum group metals, silver and copper, simply by contact with oxygen and moisture in air. Catalysts or oxidizing agents which can undergo oxidation state recovery in contact with air can maintain a capability to oxidatively degrade contaminants.

Description are provided below of the operation of a series of fire detector types with example descriptions of some effects of contamination on detector function and embodiments employing soiling resistant or self cleaning surfaces to remove or reduce such effects.

Figures 3A, 3B:
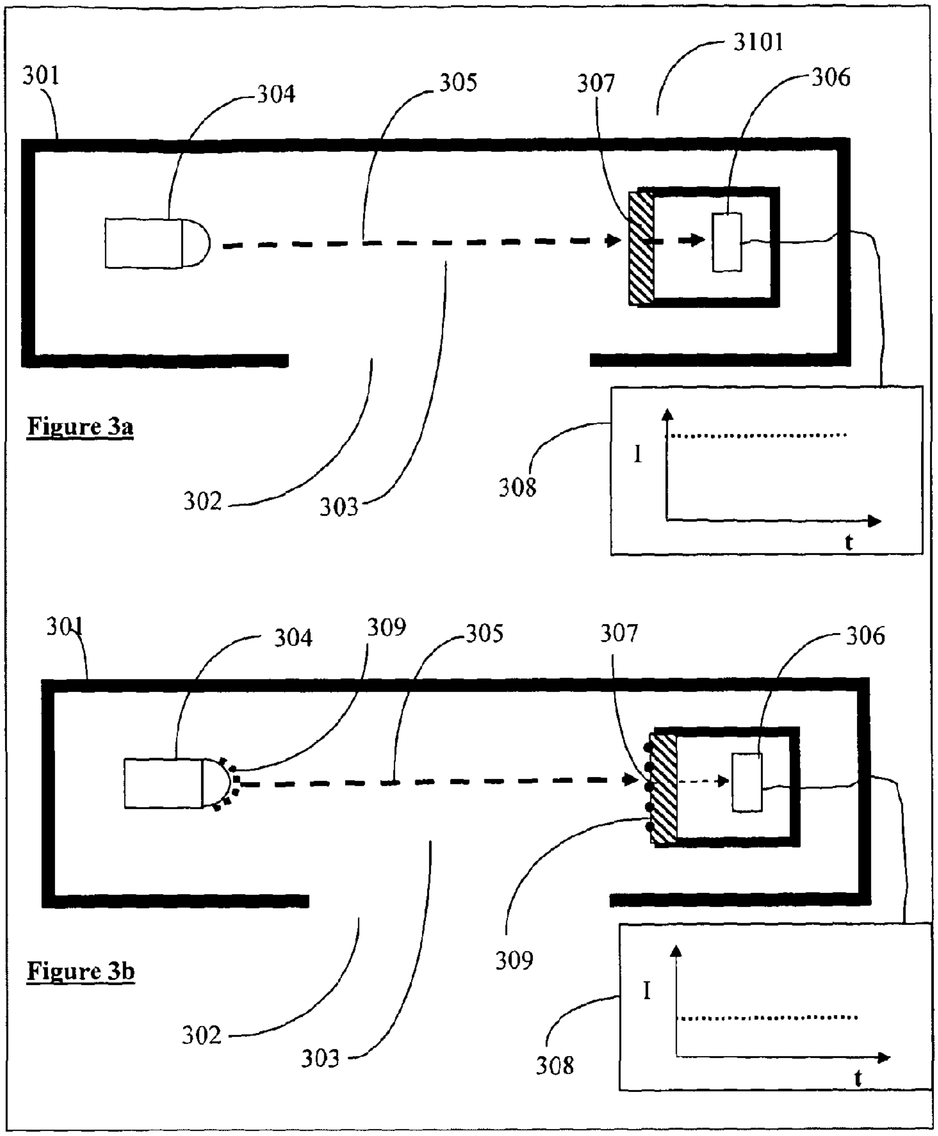
FIG. 3 represents an optical absorption based detector indicating effects of contamination on detector performance and application of contamination resistant or self cleaning materials on detector surfaces.

FIG. 3*a* is a diagrammatic representation of an optical obscuration device 3101 as may be used for fire detection by monitoring of airborne particulates or gases which absorb or scatter radiation in a selected waveband. The device may be provided with an enclosure 301 having opening 302 through which air and airborne materials can transport to a sensing region 303. In some cases such devices enclosure 301 with opening 302 may be absent and transport to sensing region 303 may be from all directions. A light source 304 provides a radiation beam 305 passing through the sensing region 303 to a photo-detector. The photo-detector 306 has window or surface 307 through which radiation passes to the photo-detector. This window or surface 307 may incorporate or additionally include optical filter and lens structures. The photo-detector 306 is provided with output monitor means 308 providing a measure I of intensity of radiation falling on the photo-detector. In absence of material entering sensing region 303 the intensity I remains high. It falls if material enters sensor region 303. Selected reduced intensity level or change with time in intensity level may be coupled to an alarm system not shown.

FIG. 3*b* shows the device as in FIG. 3*a* where exposure to the surrounding environment has resulted in material entering the device and depositing on surfaces. The quantity of material present in the sensor region 303 may have at all times remained below a level causing sufficient obscuration to active an alarm, but over a period of time material may deposit on surfaces, including surface 307, resulting in a decrease in radiation passing to sensor 306 and so reducing output as measured by monitoring means 308. Such deposition may eventually reach a threshold either falsely activating an alarm or reducing the device sensitivity to effects of material entering sensor region 303.

Figure 3C:
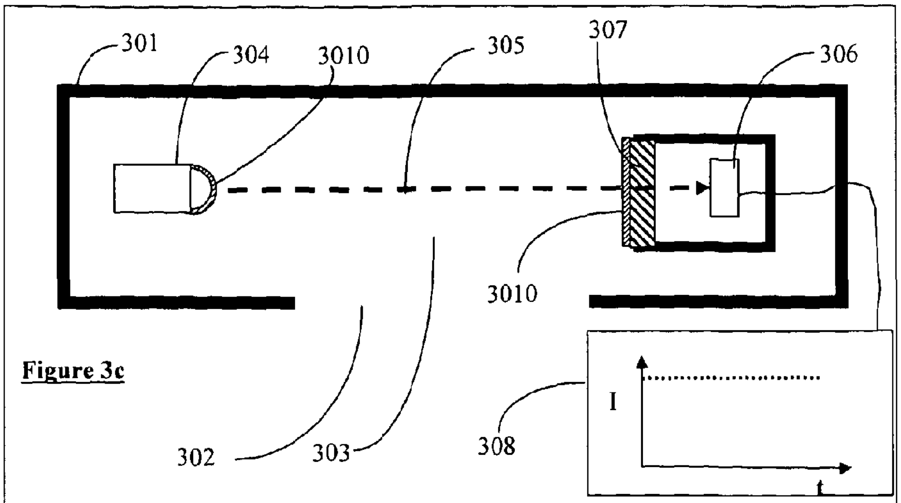

FIG. 3*c* represents an embodiment according to the present invention comprising an optical transmission type detector of the type represented in FIGS. 3*a* and 3*b* with a contamination resistant or self cleaning transparent surface layer 3010 provided on the exposed detector surfaces comprising optical surfaces of source 304 and of window 307 of the photo-sensor 306.

Figure 3D:
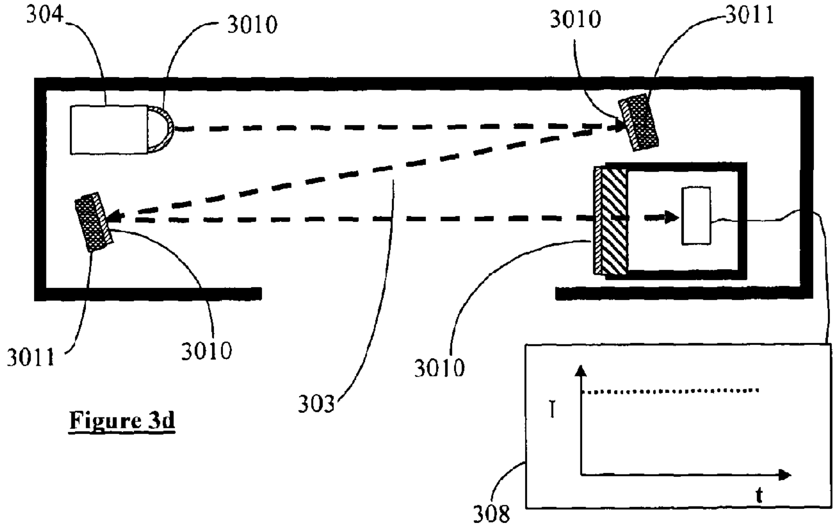

Contaminant resistant surface 3010 maintains transmission at the detector surfaces and signal level 308 for clean air conditions is not depressed. FIG. 3*d* represents an embodiment of the present invention comprising variant of an optical transmission type detector provided with mirror structures 3011 to allow beam folding where contamination resistant or self cleaning surfaces 3010 are provided on the exposed surface of window 307 and also on exposed reflecting surfaces of mirrors 3010 and on exposed transparent surface of light source 304 to prevent contamination build up and depression of signal level for clean air conditions.

The contamination resistant or self cleaning surfaces comprise either low energy surfaces or chemically active self cleaning surfaces as described earlier and with reference to FIGS. 1 and 2. The chemically active self cleaning surfaces may include photochemically activated surfaces and catalytically active surfaces. The detector may include provision not shown for illumination of photochemically active surfaces.

Figure 4A:
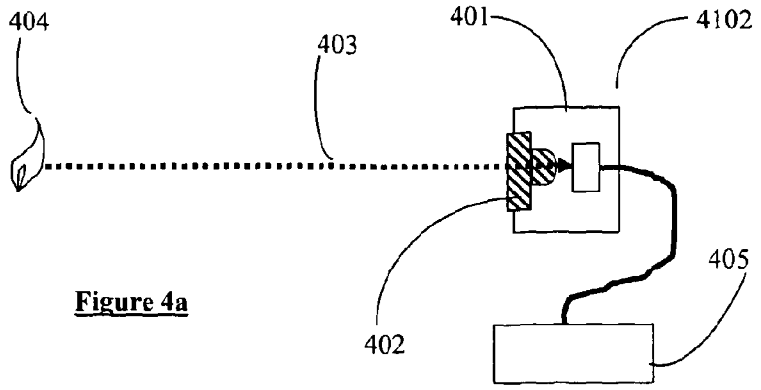
FIG. 4 represents an optical flame detector indicating effects of contamination on detector performance and application of contamination resistant or self cleaning materials on detector surfaces.

Flame detection equipment is routinely deployed at oil and fuel processing and storage plant where such contaminants may be routinely expected and often in situations where rain or mists or airborne dusts or aerosols are prevalent. For hydrogen or hydrocarbon flame detectors the detection range can be reduced because the infra red emissions from hot $H_2O$ and $CO_2$ molecules are significantly absorbed by liquid water. FIG. 4*a* is a diagrammatic representation of an optical flame detector device 4102 as may be used for detection of flaming fires by monitoring radiation emitted within the field of view of the device. The detector device 4102 incorporates an optical sensor within an enclosure 401 having a window 402 which allows selected radiation to pass to the sensor. The detector may incorporate optical structures, lenses and optical filters not shown. The detector field of view would be selected to cover places or equipment where flaming fires are considered a hazard. Radiation 403 proceeding from a flame 404 within the device field of view passes to a sensor within the detector enclosure 401 via window 402, and sensor output passing to output monitoring means 405. Means 405 may be separate or within enclosure of detector 401 and linked to alarm means not shown. Alarm means are activated at selected levels by the monitoring means. The detector will normally incorporate optical waveband filtering and time filtering not shown to allow discrimination between flames and non-flame radiant sources.

Figure 4B:
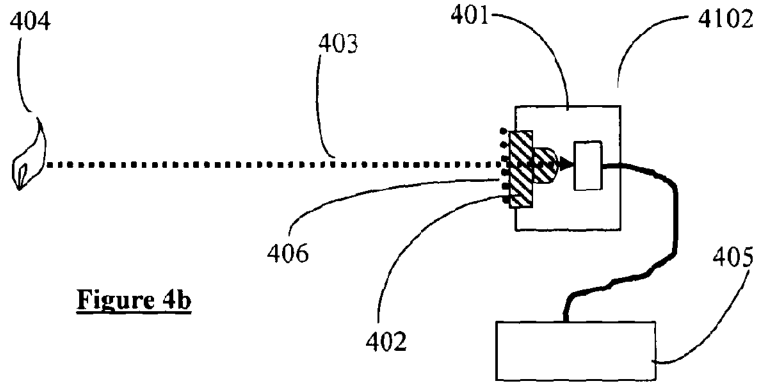

FIG. 4*b* shows the device as in FIG. 4*a* where exposure to the surrounding environment has resulted in contaminant material 406 depositing on the exposed optical surface of window component 402. Where the contaminant material 406 obscures, scatters, reflects, or deflects radiation in the waveband relevant to flame detection, the contamination can reduce sensitivity of the device to flames, decrease range over which flames may be detected, and deleteriously affect any imaging capability incorporated in detector 3102 and so provide less information on flame size and location. It is desirable that such contamination be prevented or removed.

Figure 4C:
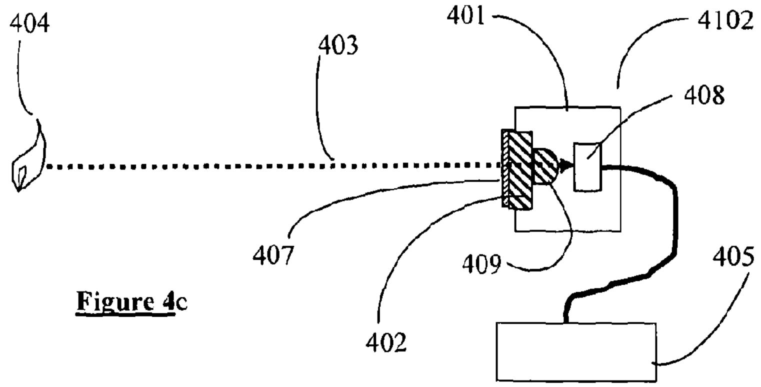

FIG. 4*c* is a diagrammatic representation of an optical flame detector device according to the present invention constructed as represented in FIGS. 4*a* and 4*b* but provided with contamination resistant or self cleaning transparent surface layer 407 on window 402. The contamination resistant or self cleaning surfaces comprise either low energy surfaces or chemically active self cleaning surfaces as described earlier and with reference to FIGS. 1 and 2. The chemically active self cleaning surfaces may include photochemically activated surfaces and catalytically active surfaces. The detector may include provision not shown for illumination of photochemically active surfaces and may also include contaminant deposit removal enhancement devices not shown as described with reference to FIGS. 1 and 2.

In the embodiment of the invention shown in FIG. 4*c*, the flame detector 4102 includes a housing 401, which is a hermetically sealed enclosure. The housing 401 is formed from stainless steel, which helps to protect it and components within the housing from damage from the environment and from mechanical damage. A sensor 408 is installed within the housing 401. The sensor 408 is connected to, and is arranged to output a signal to an output monitoring means 405. A sapphire window 402 is installed the housing 401, which allows the transmission of radiation therethrough, onto the sensor 408. A lens 409 is installed between the window 402 and the sensor 408.

A thin layer 407 of titania ($TiO_2$) is deposited on an outer surface of the window 402. The layer 407 of titania is deposited on the window 402 by sputtering or chemical vapour deposition with a deposition system allowing film thickness control. The thickness of titania layer is between 20 nm and 40 nm. To ensure that the housing 401 is airtight, the window 402 is mounted in housing 401 using a resilient sealing gasket (not shown) or a compound such as silicone rubber (not shown). The detector 4102 is mounted so that the field of view of the sensor 408 includes the area to be monitored by the detector.

The layer 407 of titania exhibits hydrophilic and oxidative properties when exposed to radiation in the near ultraviolet (UV) to visible blue waveband. Exposure to radiation within this waveband is achieved from sunlight when the detector is mounted in an outdoors location. However, when the mounting position or the local environment does not allow adequate exposure to sunlight, photoactivation of the titania layer 407 is promoted by a UV radiation discharge lamp (not shown) mounted adjacent to the window 402.

Figures 5A, 5B:
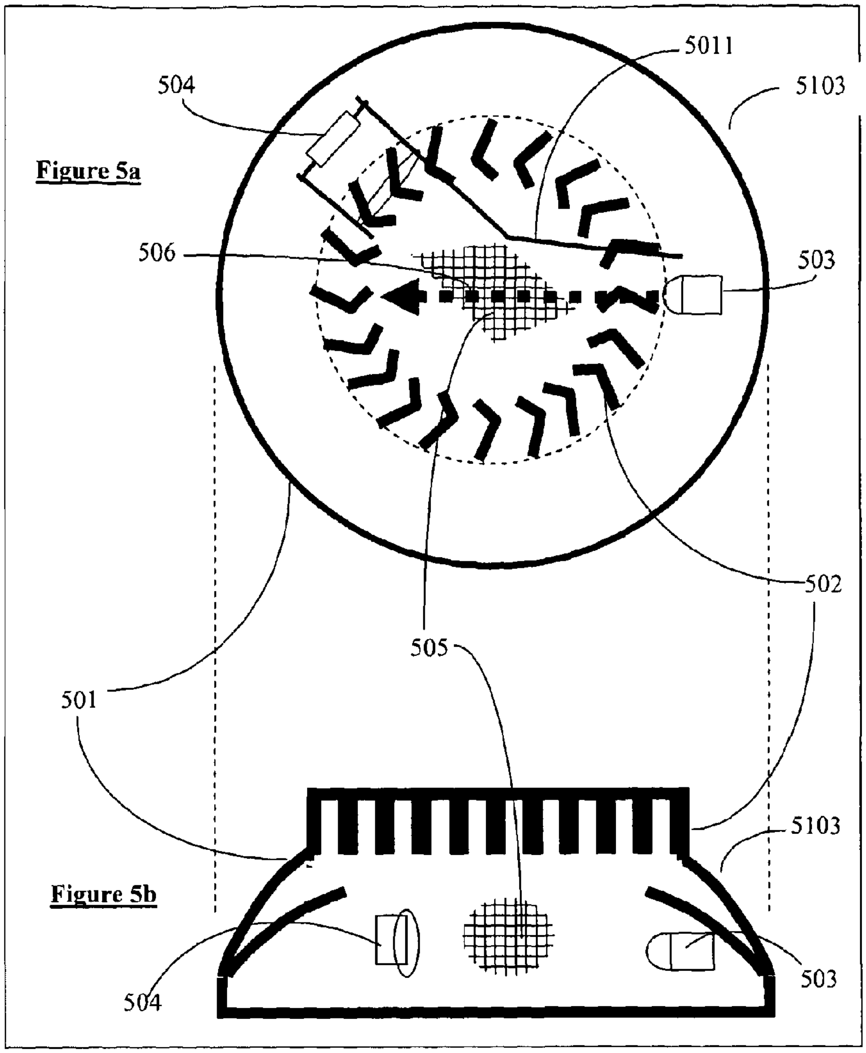
FIGS. 5 and 6 represent the structure and function of an optical scatter type smoke detector.

The window 402 and lens 409 are transparent to radiation at the wavelength at which the detector is arranged to detect. For a flame detector, the window 402 and lens 409 are transparent to radiation at a wavelength of around 4.3 μm. It will be appreciated by one skilled in the art that various modifications may be made to this embodiment. For example, one or more optical filters (not shown) may be installed in the housing 401. The window 402 may be formed from materials other than sapphire, such as alumina or silica. While the layer 407 of titania has a preferred thickness of 20 nm to 40 nm, the layer may be from 10 nm to 100 nm thick. The UV radiation discharge lamp (not shown) may be replaced with an LED (not shown) emitting radiation having a wavelength in the range 250 nm to 500 nm. Light scattering by smoke is widely used in fire detection devices. FIGS. 5*a* and 5*b* represent in diagrammatic form plan and side views of an optical scatter type smoke detector 5103. An enclosure 501 has a structure 502 constructed to allow access for air and airborne material but preventing or substantially reducing transfer of light or other radiation into the detector body. A light source 503 is positioned to direct a light beam 506 through an air sampling space or detection volume 505 into which smoke can pass via structure 502, and a photo-sensor 504, facing the sampling space, but displaced sufficiently from the line of the light beam 506 so that little or no radiation from the source passes directly to the detector. The detection volume 505 is defined by the intersection of the spread of beam 506 from source 503 and the field of view for photo-sensor 504. Within the detector 5103, light 506 from the light source 503 passes from open or transparent source housing, possibly through a window (not shown), optical filter (not shown), or lens structure (not shown) across the air sampling detection volume 505 and in the absence of scattering material (smoke) in that space impinges onto surfaces or structures forming part of the structure around the air sampling space where the majority of the radiation is absorbed. The photo-sensor 504 can also be provided with window, optical filter and lens structures (not shown). The structure 5011 adjacent to the air sampling space 505 is formed such that, in the absence of particulates in the sampling air space, reflections or scattering from the structure surfaces result in no, or only a controlled low level of, light falling onto the photo-sensor 504. A mesh structure, not shown, may be positioned between the external environment and the detection volume 505 to prevent ingress of flies or other small arthropods which may act as scattering centres.

Figure 6:
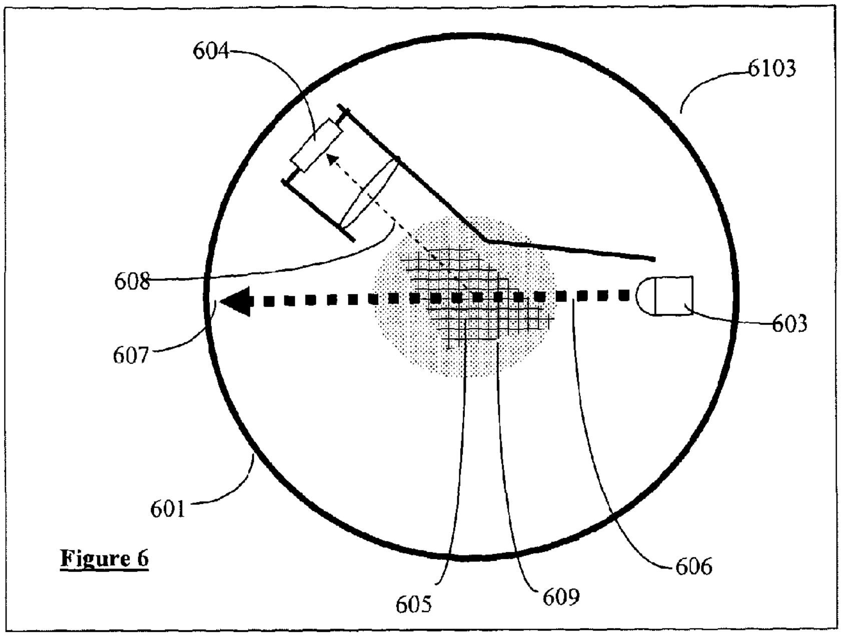

The light trajectory associated with detection of smoke or other scattering material entering the sensor volume is represented in FIG. 6. When particles, such as smoke particles 609, pass into the detection volume 605, a portion 608 of the light scattered by those particles falls on the photo-sensor 604, which generates a signal. The intensity of the light 608 scattered by the smoke particles 609 onto the photo-sensor 604, and the resultant signal, can be related to the quantity of smoke and selected levels taken as indicative of a fire situation and may activate an alarm, not shown.

Contamination, including deposition of dust or condensates, can affect the reflectivity of surfaces surrounding a detection volume. changing, the background signal level. Sufficiently extreme changes can limit measurement range. Other optical components such as radiation sources, lenses and photodetectors can also become coated, which can cause changes in output or sensitivity of the components. Inner walls of the detector chamber are normally formed of black or dark material and shaped to provide a light absorbing structure 607 to reduce wall reflections and scattering. The light absorbing structure 607 is provided to substantially absorb the direct light of beam 606 that has passed through detector volume 605.

In practice the light absorbing structure 607 may not be completely effective and this can allow a portion of the original light beam 606 to be scattered or reflected off of detector structures and walls so that a small proportion of that light does fall on photo-sensor 604 even in the absence of scattering material within detector volume 605.

Figures 7A, 7B, 7C:
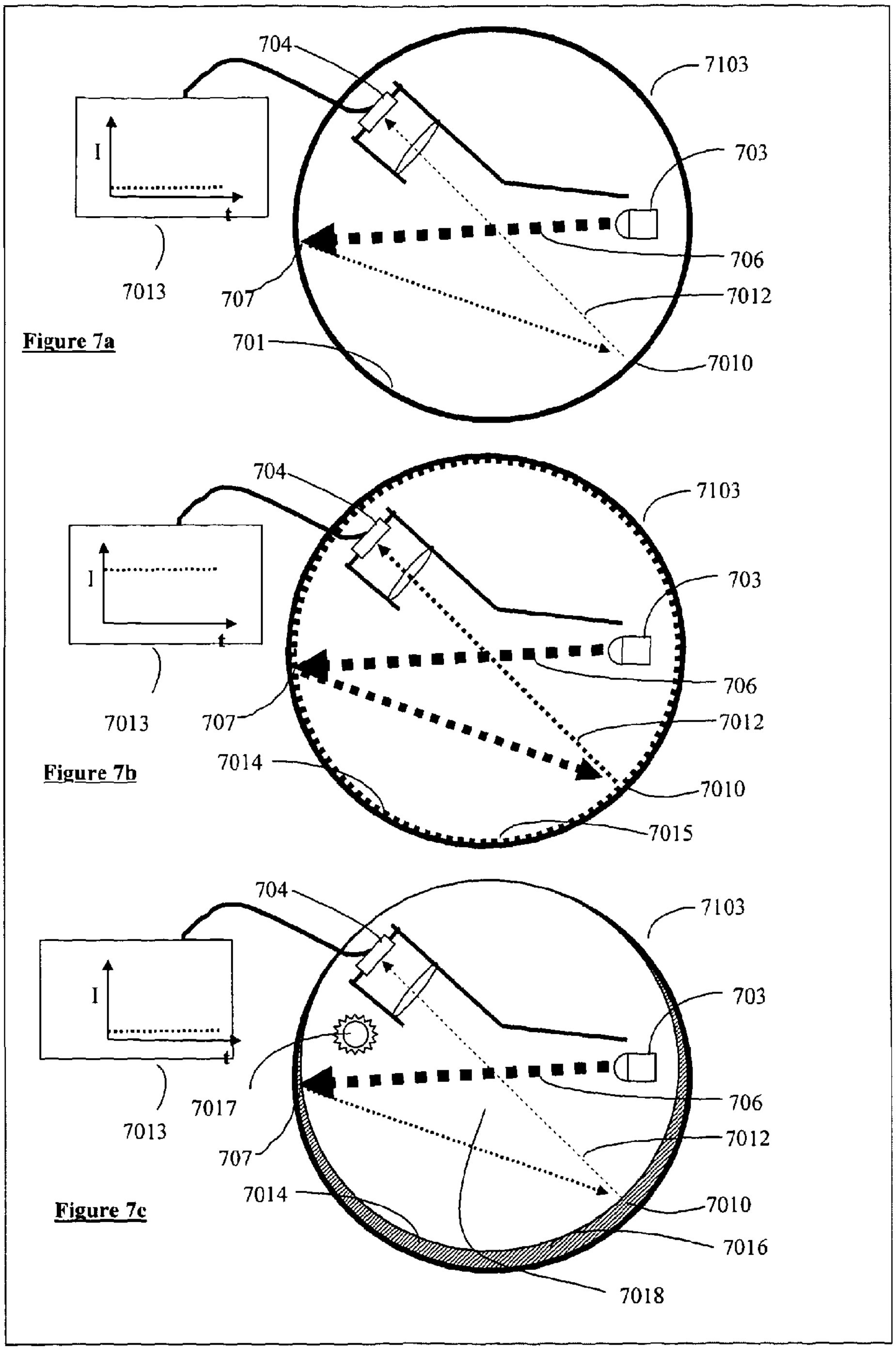
FIG. 7 represents an optical scatter type detector indicating effects of contamination on detector performance and application of contamination resistant or self cleaning materials on detector surfaces.

FIG. 7*a* represents a clean detector where detector wall 709 does not bear a contaminating deposit. Partial scattering or reflection of beam 706 at multiple points represented by points 707 and 7010 results in an attenuated beam 7012 falling on photo-senor 704 producing a low level output 7013. The represented light path is illustrative only and there may be other pathways. It can be advantageous to have a small portion of the light from source 703 reaching detector 704 providing a non-zero background level signal in the absence of smoke in detector volume 705 to provide a check on source and photo-sensor function. It is however important that the background level signal remains relatively low and stable.

Exposure of the detector to an environment bearing some contaminant load may result in deposition of contaminants onto the detector components. This may occur over long periods while instantaneous aerosol levels may remain below that which would generate alarm or trouble signals due to scattering material in the detector volume.

Over time, exposure to an environment bearing a contaminant load can result in deposits on or modification of the optical surfaces resulting in changes in the light fluxes into the sampling space, in the fluxes reflected or scattered from the surrounding surfaces, in fluxes passing through optical components, and through the photo-sensor surface to be detected. FIG. 7*b* represents the situation where a device has been subjected to contamination resulting in accumulation of deposited material 7015 on detector wall 7014. Most generally this will result in some increase in reflectivity or light scattering at the surface. Example light path via wall points 707 and 7010 results in an increase in the light beam 7012 directed at photo-sensor 704 and hence an increased background signal 7013 for clean air. If this rise is excessive it can give rise to false alarm signals or excessively limit the measurement range of the detector limiting the ability of the detector to respond correctly to a real fire and discrimination against false stimulus such as dust or steam.

FIG. 7*c* is a diagrammatic representation of an optical scatter smoke detector according to the present invention constructed as represented in FIGS. 5 to 7*b* but provided with contamination resistant or self cleaning surface layer 7016 on surface 7014. The contamination resistant or self cleaning surfaces comprise either low energy surfaces or chemically active self cleaning surfaces as described earlier and with reference to FIGS. 1 and 2. The chemically active self cleaning surfaces may include photochemically activated surfaces and catalytically active surfaces. The detector may include provision of a source 7017 for illumination of photochemically active surfaces and may also include contaminant deposit removal enhancement devices not shown but as described with reference to FIGS. 1 and 2, but not generally including the use of additional flowing liquid.

In the embodiment of the invention shown in FIG. 7*c*, the smoke detector 7103 has a housing 7010 which defines a detection volume 7018. The housing 7010 is moulded from dark-coloured, preferably black, polymer material. The inner surface 7014 of housing 7010 is provided with a fluorocarbon coating 7016. The coating 7016 presents a low energy hydrophobic and oleophobic surface fluorocarbon surface to the air within the detector housing 7010. It will be appreciated by one skilled in the art that the fluorocarbon coating 7016 may be deposited on the inner surface 7014 of the housing 7010 by a variety of methods including dipping the housing 7010 into a liquid containing the fluorocarbon, spraying the housing with solutions or suspensions of fluorocarbon polymers or non volatile compounds, or by chemical vapour deposition treatments which may include plasma processes depositing and/or binding fluorocarbon moieties to the inner surface 7014 of the housing 7010. Dipping or spraying the fluorocarbon coating 7016 onto the housing 7010 may be carried out using solutions of Teflon AF (0.5 to 5%) in perflourocarbon solvents followed by evaporative removal of the solvent. Alternatively, the deposition of the fluorocarbon coating 7016 may be carried out using commercially available vapour or plasma deposition processes. The presence of the coating 7016 on the inner surface 7014 of the housing 7010 results in a reduction in the adhesion of contaminants entering the housing 7010, and adherent material is more easily displaced by air flow or vibration.

In another embodiment of the invention, the smoke detector 7103 shown in FIG. 7*c* has a coating 7016 which is a self cleaning coating. The coating 7016 includes a material that promotes oxidative degradation of organic contamination materials. The coating 7016 is photo-activateable, and the self-cleaning properties are activated by radiation having a wavelength within the ultraviolet to visible blue waveband. An LED 7017 is installed within the housing 7010, and is arranged to emit radiation at a wavelength of around 370 nm. While various materials are suitable for the coating 7016, in this embodiment, titania is used. The titania coating 7016 can be deposited onto the housing 7010 by sputtering, or by dipping or spraying the housing 7010 with a suspension of titania nanoparticles in a carrier fluid. The thickness of the coating 7016 is between 10 nm and 100 nm. The suspension is made using commercially available titania nanoparticles in aqueous or non aqueous fluids with oxidation resistant binding agents such as silicates. In an alternative embodiment, the self cleaning material is a composition containing a metal oxide. Such a metal oxide coating promotes oxidative degradation of organic material without the need for photoactivation. The metal oxide may be $MnO_2$, $CuO_2$, or a mixture of metal oxides. Such mixtures may additionally contain some catalytic metal such as platinum black. Mixtures of oxides including $MnO_2$, $CuO_2$ are effective normal ambient temperatures for removal of slowly accumulating organic contaminants. The non photoactive oxide coatings in liquid suspensions, which may contain non oxidisable binding agents such as silicates, are applied with a thickness of around 20 μm to 500 μm. $MnO_2$, and $CuO_2$ are black materials suitable for coating the chamber walls of optical scatter smoke detectors.

The materials described above exhibit self cleaning and/or contaminant-resistant properties at ambient temperatures. In this specification, the term "ambient temperature" is intended to mean the temperature of the air in and surrounding a detector during normal use, in the absence of any additional temperature control to increase or decrease the temperature. Such materials do not require the application of heat in order for them to exhibit the self cleaning and/or contaminant-resistant properties.

Figures 8A, 8B, 8C:
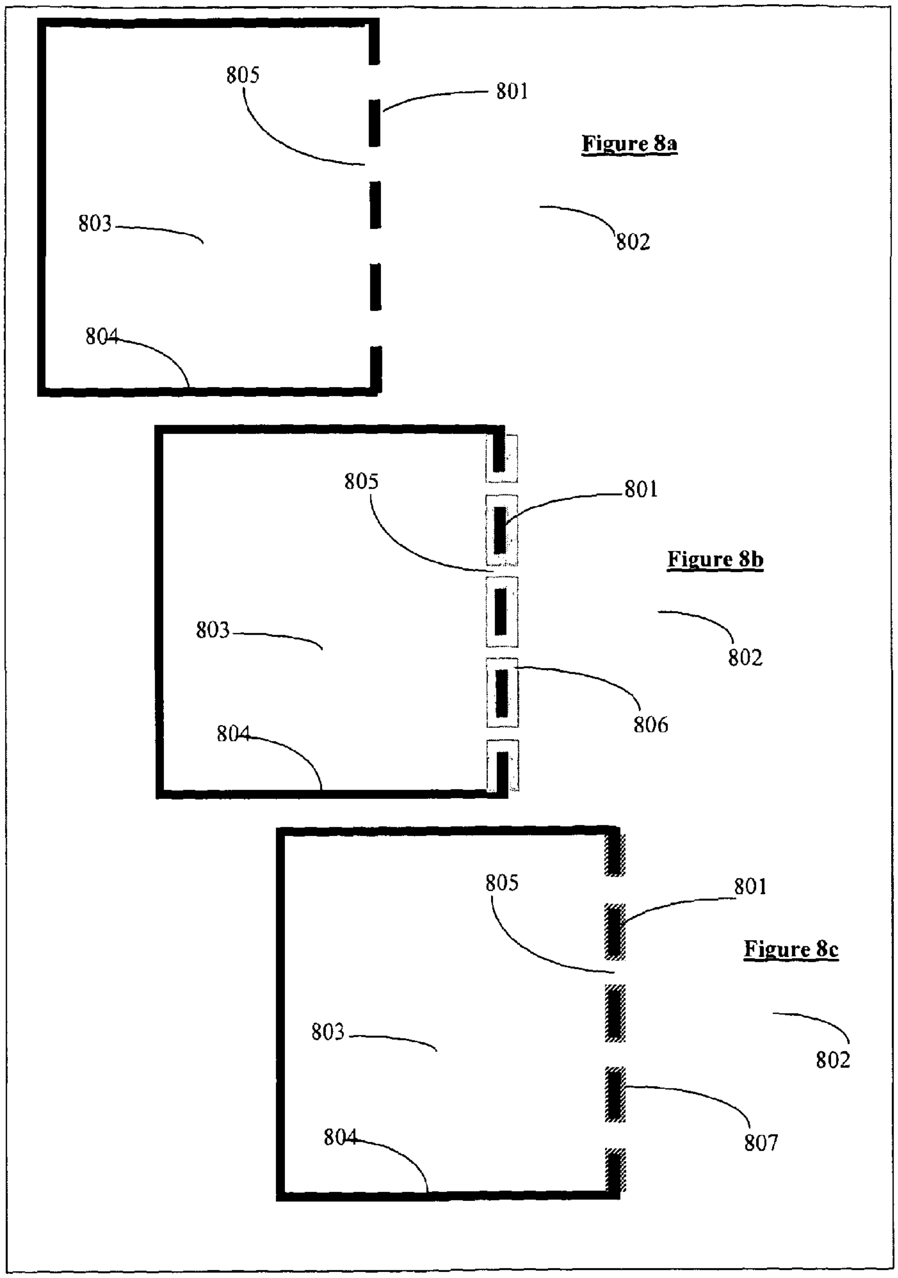
FIG. 8 represents a mesh structure restricting access to a sensor volume of a fire detector indicating effects of contamination on detector performance and application of contamination resistant or self cleaning materials on detector surfaces.

Effects of surface contamination on detector performance is not limited to effects on optical components. Contamination build up can affect gas or smoke mass transport to sensor regions by partial closure of pathways. In electrochemical and heated metal oxide gas sensors, the active surfaces may have some inherent self-cleaning capability, but filters and gas transport pathways can be affected by accumulation of contaminants. Partial blocking or occlusion of transport pathways can restrict width of air flow and diffusive pathways and/or increasing effective diffusion distances and hence reduce sensitivity and increase response times.

Where restricted openings are required to exclude ambient light, insects or other foreign objects, or to control diffusion paths, contamination build up on detector surfaces can affect heat and mass transport to sensor regions within detectors by partial closure of pathways. FIG. 8*a* represents a mesh structure 801 separating an external environment 802 from a sensing region 803 within an enclosure defined by walls 804. Meshes are selected to have sufficient aperture size and open area to allow required air transport while providing the size exclusion required to prevent insect ingress. Openings in such meshes are normally in the range 0.5 to 1.5 millimeters across. Detector set up or calibration takes into account any significant effects of the installed mesh. FIG. 8*b* represents a mesh where material 805 has built up on the surface to partially obstruct the apertures. Sufficient contamination build up can result in unacceptable reductions in transfer of air through the mesh and reduced detector sensitivity. In contaminated, especially dusty, environments it is known for contamination to build up layers of millimeter thickness or more. FIG. 8*c* represents a mesh with contaminant resistant or self cleaning capability provided according to the present invention where contaminants do not build up as represented in FIG. 8*b*. Such self cleaning layers may be very thin, conventionally a few micrometers or less, and coatings may be chosen that have thickness of less than 1 micrometer. The thickness of self cleaning layer 807 in FIG. 8*c* is for illustrative purposes only and self cleaning materials applied only as very thin layers do not significantly interfere with through mesh, air, gas or smoke particle transport. Although such contamination related transport restrictions and alleviation by use of contamination resistant or self cleaning surfaces are represented in FIGS. 8*a* to 8*c* as applying to mesh structures, the same principle applies to other restricted openings within detector devices including vane structures used for light exclusion and gas sensor inlet structures, and the present invention may be applied to detector surfaces defining such structures. Contamination build up can also affect electrical and thermal transport and can enhance corrosive damage to electrical circuits.

Figures 9A, 9B, 9C, 9D:
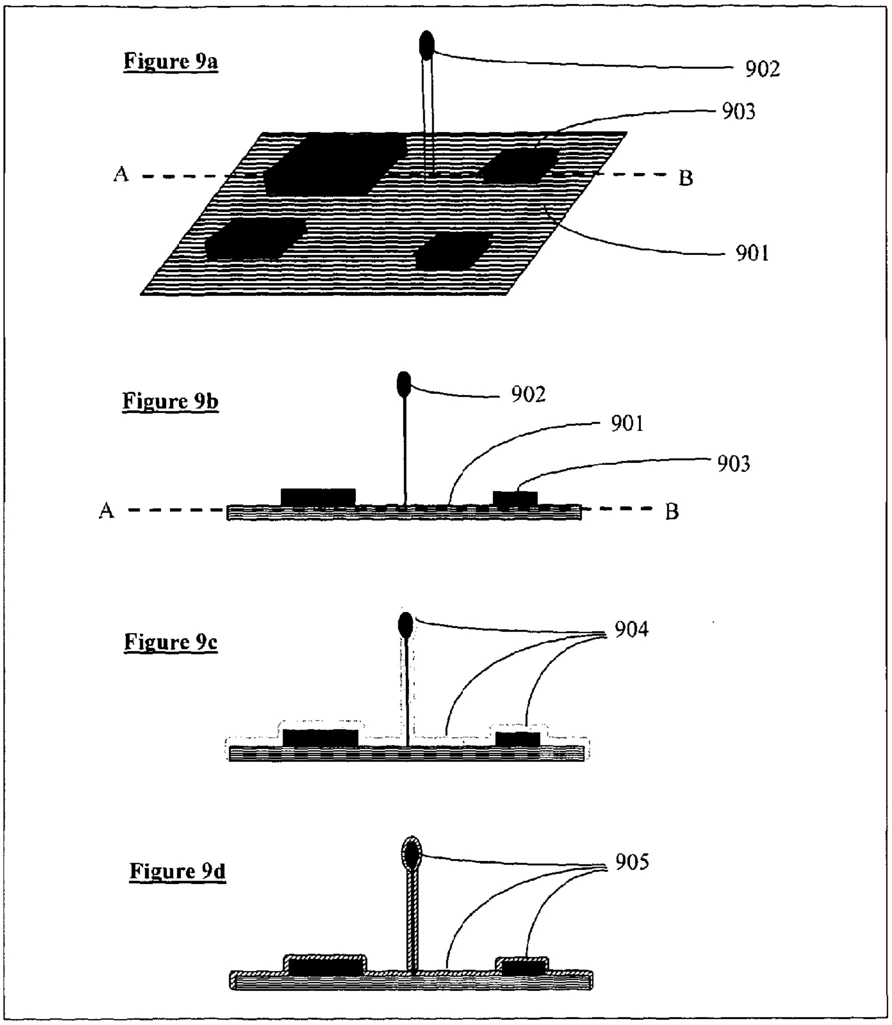
FIG. 9 represents an electrical circuit structure and heat sensor of a fire detector indicating effects of contamination on detector performance and application of contamination resistant or self cleaning materials on detector surfaces.

Fire detector devices generally include electronic circuitry as well as sensors. In detectors or sensors employing measurements of electrical parameters such as resistance, current or potential, the deposition of material on the wires to the component or adjacent circuitry can affect sensitivity by providing parallel conduction tracks. Such effects on the circuitry for optical detectors, gas sensors, ionisation smoke sensors, and temperature sensors can change sensor system output or stability. Operating circuit components and sensors are generally linked on circuit boards and while conformal coatings are often used to protect circuit elements from environmental effects, there are commonly exposed areas necessitated by assembly requirements or economic considerations. FIG. 9*a* is a diagrammatic representation of a detector circuit board 901 provided with components 903 and sensor 902. The sensor may be a temperature sensor such as a thermistor. FIG. 9*b* represents a section through the same structure along the line AB indicated on FIG. 9*a*. FIG. 9*c* represents a section through the structure which as a result of exposure to a contaminated environment has built up a contaminant layer 904. Where the contaminant coating the sensor point of a thermistor or other electronic temperature sensor, build up to a significant thickness, the contaminant can affect the sensor performance by modifying heat transfer from the surrounding air to the sensor, and modifying the thermal mass of the sensor. In contaminated, especially dusty, environments it is known for contamination to build up layers of millimeter thickness or more. This can affect the sensitivity and time response of the sensor. Even when contamination layers remain relatively thin, the contamination on the circuit board and components, including connections to a sensor such as a thermistor can affect their electrical properties. Particularly where contamination includes aqueous condensates or salts, electrical resistances and isolation can be modified affecting apparent sensor outputs. Changes in electrical isolation can be particularly important for high impedance circuitry. Maintenance of such electrical isolation with high impedance circuitry is in particular required for ionisation type smoke detectors. Contamination can also increase corrosive damage to electrical circuit elements which can eventually lead to device failure. It is therefore desirable that excessive contamination of the electrical component detector surfaces be prevented or removed.

FIG. 9*d* represents a section through the detector structure where the structure has been coated with contamination resistant or self cleaning layer 905. Such contamination resistant or self cleaning layers may be very thin, conventionally a few micrometers or less, and coatings may be chosen that have thickness of less than 1 micrometer. The thickness of contamination resistant or self cleaning layer 905 in FIG. 9*d* is for illustrative purposes only. Such thin coatings of selected contamination resistant or self cleaning materials do not have significant effects thermal or electrical properties of detector structures. For protection of electrical circuit structures and where moisture repellence is desired, it is advantageous to employ hydrophobic contamination resistant coatings.

Where ambient external radiation is excluded from the interior of a smoke or fire detector, the use of photoactivated self-cleaning materials, requires the supply of suitable radiation. Most conventionally, optical scatter smoke detectors employ an infrared LED emitting at 0.8 to 1 micrometer wavelength which does not generally promote significant photochemical reaction. Use of blue (approximately 470 nm) and near-UV light emitting diodes (LEDs) (approximately 330-400 nm) can promote photochemical cleaning at surfaces containing $TiO_2$ and some other transition metal compounds e.g. $In_2O_3$, ZnO, $FeO_x$, $Cu_xO$, $WO_3$. Where an LED used for the sensing purpose does not of itself generate sufficient or suitable radiation, the detector can be provided with one or more suitable emitters. Suitable sources can include discharge lamps, including mercury vapour discharge lamps, with or without provision of phosphors to modify spectral output, microplasma sources, or light emitting diodes (LEDs), especially devices emitting strongly in the blue to UV wavebands, such as LEDs using Gallium Nitride, Indium Nitride, and Aluminium Nitride and combinations thereof including in heterojunction structures, or other suitable semiconductor sources with suitable bandgaps such as ZnO (nanowire), boron nitride, or diamond based sources.

Where the optically activated self-cleaning materials are transparent at wavelengths relevant to the fire detection function, the surface of transparent optical components such as windows, lenses, or light guides can bear coatings of, or can include, such materials. This can include enclosures and lens structures incorporated in light sources.

Where the environment allows natural radiation, sunlight, and natural precipitation (rain) to promote the cleaning operation on photochemically activate surfaces there is no need for provision of supplementary illumination or wash fluid to act with the material on windows or lenses which form part of the outer surface of a detector.

In environments where ambient radiation can not be relied upon to drive the requisite level of photochemical activity then suitable illumination sources can be provided such that radiation in the requisite wavelength band falls onto the outer surface of the window or lens components. Such illumination sources can be positioned so that those surfaces are so illuminated without that radiation passing or being refracted into the field of view covered by the sensing devices within the detector.

Separation of detector signals from response to emitters used to drive the self-cleaning processes may be provided by suitable optical filters or use of time filtering where detection or photoactivation is operated in a pulsed mode. The intensity or duration of radiation provided for photochemical cleaning can be controlled in a feedback arrangement based on the transmission of radiation to an optical detector. That detector can be one present for the primary smoke sensing purpose or alternatively can be one or more provide for monitoring the optical condition of components of the sensing system. To prevent emissions provided for self-cleaning purposes from damaging detector components, emission source operation may be restricted to periods where significant contamination is detected and by provision of suitable shielding of sensitive components.

Surfaces containing, or coated with, photochemical catalysts can also be selected to provide some conductivity which can include photoconductivity, thereby providing electromagnetic screening and dissipation of static charge, which later can reduce collection of contaminant materials or indeed filtering effects on smoke that can occur for structures not provided with static charge dissipation means. The self-cleaning catalysts can be chosen to be either near transparent at wavelengths used in sensing, especially where deployed on optical components such as windows, lenses or mirror surfaces. Alternatively self-cleaning catalysts can be chosen to be relatively absorbing at the wavelengths used in sensing, especially where deployed on housings or optical labyrinths where high optical absorptions or low reflectivity is desired.

Low energy or hydrophobic surfaces and chemically or photochemically active surfaces can be independently used in detectors to reduce contamination effects, they can also be used in combination both in different parts of the detector, or together on the same surfaces, including in micro-mosaic form. In particular, it is proposed that the self-cleaning function of a hydrophobic surface or of a chemically activated or photochemically activated surface is used to enhance the performance of detectors used for security or safety monitoring purposes and, particularly, for fire detectors.

The invention claimed is:

1. A detector for a fire related conditions including a component having a surface;

wherein the surface includes, or is at least partially coated with a material having contaminant-resistant properties; and wherein the material comprises a low energy material having a contact angle to water of greater than about 65 degrees in air;

the detector further including a contamination monitor disposed adjacent the surface, the contamination monitor configured to monitor an amount of contamination on the surface and to generate an output signal representing the amount of contamination; and a removal enhancement device disposed adjacent the surface for aiding in the removal of contaminants from the surface, the removal enhancement device being operated in response to the output signal from the contamination monitor.

2. A detector according to claim 1, wherein the material has a contact angle to water of greater than about 90 degrees in air.

3. A detector according to claim 1, wherein the material is a material selected from the following group: hydrophobic material, super-hydrophobic material, oleophobic material, hydrocarbon group material, fluorocarbon group material, hydrocarbon polymer material, fluorocarbon polymer material, fluorocarbon copolymer material, fluorocarbon molecular attached film material, diamond surfaced material and diamond-like carbon surfaced material.

4. A detector for a fire related conditions including a component having a surface;

wherein the surface includes, or is at least partially coated with a material having self-cleaning properties at ambient temperatures; and wherein the material is arranged to exhibit hydrophilic properties;

the detector further including a contamination monitor disposed adjacent the surface, the contamination monitor configured to monitor an amount of contamination on the surface and to generate an output signal representing the amount of contamination; and a removal enhancement device disposed adjacent the surface for aiding in the removal of contaminants from the surface, the removal enhancement device being operated in response to the output signal from the contamination monitor.

5. A detector according to claim 4, wherein the material comprises one or more metal oxide materials.

6. A detector according to claim 4, wherein the material is arranged to promote oxidative degradation of organic materials.

7. A detector according to claim 4, wherein properties of the material are exhibited on activation by photonic radiation.

8. A detector according to claim 4, wherein the material is an oxide of a metal selected from the following group: manganese, copper, silver, iron, and titanium.

9. A detector according to claim 8, wherein said contaminant-resistant or self-cleaning properties of the material are promoted by exposure to radiation having a wavelength within the visible to ultraviolet range.

10. A detector according to claim 8, wherein said contaminant-resistant or self-cleaning properties of the material are promoted by exposure to radiation having a wavelength within the range 200 nm to 600 nm.

11. A detector according to claim 4, wherein the material further comprises noble or Platinum group metals.

12. A detector according to claim 4 wherein the material is rendered hydrophilic by photoactivation, and the hydrophilic material has a contact angle to water of less than about 25 degrees in air.

13. A detector according to claim 12, wherein the material has a contact angle to water of less than about 10 degrees in air.

14. A detector according to claim 1, further comprising a radiation source arranged to activate a photoactivatable contaminant-resistant or self-cleaning material.

15. A detector according to claim 1, wherein the contaminant-resistant or self-cleaning material is selected such that changes to the surface on in which the material is present, do not substantially alter or degrade component properties relevant to detector function.

16. A detector according to claim 1, wherein the component surface is an optical surface, wherein properties of said optical surface are selected for wavebands within one or more of the UV, visible, and infra red parts of the optical spectrum, and where a detector component is a component selected from the following group: an optical absorber, an optical reflector, an optically transmissive structure, an optically scattering surface, a light trap, a window, a lens, a mirror, a light pipe, a light guide, a filter, a light source and an optical sensor element.

17. A detector according to claim 1, wherein the component surface is a surface where surface condition affects mass transport, or heat transport or capacity adjacent to said surface, or electrical properties of said surface including surface conductivity, capacitance, or corrosion potential, and where said detector component is a component selected from the following group: an air passage conduit, an ambient light screen, a mesh or insect screen, an electrically active component including an electrically conductive component, a temperature measuring device, a potential measuring device, a current measuring device, and an ionisation source.

18. A detector according to claim 1, further comprising one or more means for enhancing deposit removal from said component surface, which means may be selected from the group:

orientation of said surface to aid deposit removal by other processes including ambient processes including gravitation, inertial effects, vibration, wind, and rain, provision of air or other fluid flow by fan or pump, artificially inducing vibration through the component or adjacent air, and provision of heating at or adjacent to the component.

19. A detector according to claim 1, further comprising means for monitoring condition of said component surface, which means may include one or more of detector background signal level, or provision of optical systems which may include an optical source directing radiation onto said surface and an optical sensor to measure light transmitted through, or reflected or scattered from said surface.

20. A detector according to claim 1, further comprising a control system to apply one or more of means for photoactivation of a contamination-resistant or self cleaning surface and means for enhancing displacement of deposits from said component surface, which control means may receive input from component surface condition monitoring means and apply means for photoactivation or deposit displacement enhancement in a feedback arrangement based on a predetermined level of said input or on output of an algorithm based on said input.

21. A detector according to claim 1, wherein said contamination resistant or self cleaning material is renewed or reapplied periodically or in response to the output signal from the contamination monitor.

22. A detector according to claim 1, wherein said surface of the component comprises an external surface.

23. A detector according to claim 1, wherein the detector is a smoke, flame, gas, or temperature detector.

24. A detection system comprising a plurality of detectors, which plurality of detectors includes at least one detector being a detector according to claim 1.

* * * * *